Patented Dec. 6, 1949

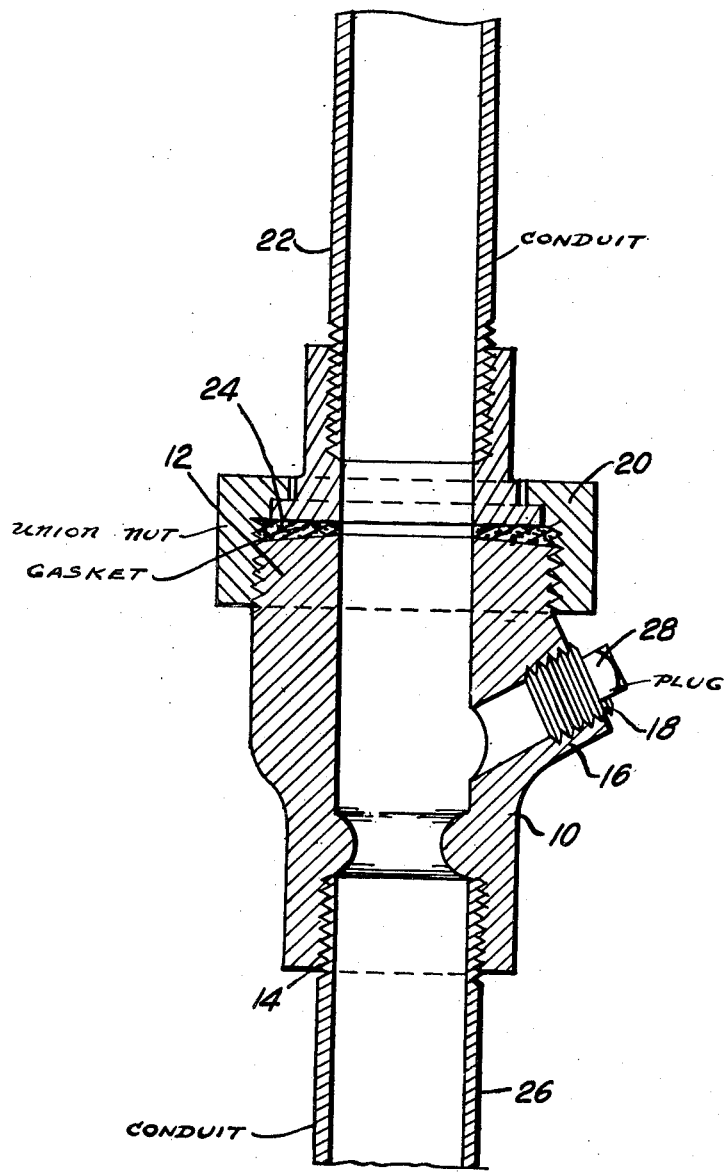
FIG. - I

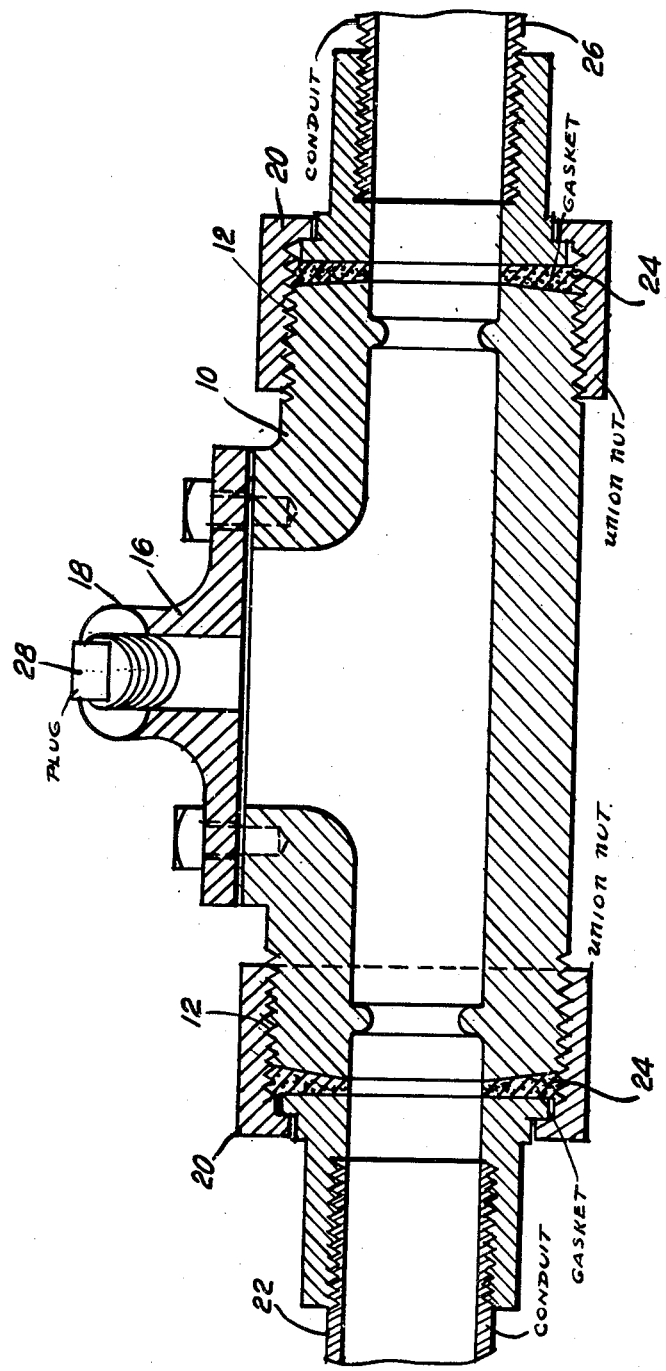
FIG.-II

2,490,328

UNITED STATES PATENT OFFICE 2,490,328

ELECTRICAL CONNECTING AND
SEALING DEVICE

Clarence Dilts Van Fleet, Somerville, N. J., assignor to Standard Oil Development Company, a corporation of Delaware Application December 29, 1945, Serial No. 638,425

1 Claim. (Cl. 285—205)

This invention relates to the making of explosion-proof electrical circuits, and in particular to an improved device for sealing circuit breakers from the general wiring system.

In the prior art, devices called "sealing condulets" have been made for making a gas-tight connection in electric circuits. These condulets have been used, for example, for sealing circuit breakers and similar equipment from the general wiring systems in industrial layouts. This sealing is necessary to prevent hazards of explosion which may occur when electrical circuit breakers and similar equipment are exposed to combustible gases as a result of leakage of such materials through the general wiring conduits.

In general, these condulets are small pieces of metal piping internally threaded at both ends and with an internally threaded branch opening near one end of the pipe. Thus, these devices have been made to permit under easily adjustable conditions the sealing in the device of the wires of the general wiring system from the wires connected to the circuit breaker by pouring from the side opening a sealing material such as sealing compound around the wires of the general wiring system after connection has been made of the wires to the circuit breaker. The wires from the general wiring system and the circuit breaker project into the condulet from connecting elements secured in the ends of the condulet. The branch opening is usually closed by the insertion of a plug threaded for attachment upon the threads of the branch opening.

The device of the present invention is an improved form of the prior art condulet. Essentially it consists of a similar piece of metal piping with an internally threaded branch opening near one end. At least one end of the piping is externally threaded for connection directly or through a gasket to a union nut for subsequent connection through a connecting element to one end of the electric circuit system. When only one end of the piping is externally threaded, the other end is internally threaded for attachment of the connecting element carrying the wires from the other end of the electric circuit system. When the piping is externally threaded at both ends for union nuts, connection may be made directly or through a gasket to the connecting element from both ends of the electric circuit. This one-piece condulet thus takes the place of the prior art type of condulet and at least one of the previously used connecting elements to the electric circuit since the external threading of the condulet permits its connection directly to the circuit breaker. Moreover, in view of the union connections of this improved form of condulet, the device can be opened and the circuit breakers removed and replaced without breaking the sealed condulet up to that point.

In order that the invention may be understood more clearly, illustration is presented of the following embodiments illustrated in the accompanying drawings and further described as follows. In the drawings and description, similar numerals refer to similar parts.

In Figure 1, a condulet having one end externally threaded and the other end internally threaded is shown. In Figure 2, a condulet externally threaded at both ends is shown.

In Figure 1, the condulet 10 is shown as consisting of metal piping having external threads 12 and internal threads 14 and a branch opening 16 with internal threads 18. A union nut 20 has internal threads adapted for connection upon the external threads 12. The union nut is also internally threaded for connection of the conduit 22 from the circuit breaker. Between the end of the piping 10 and the sealing surface of the union nut 20 a gasket 24 is placed. The internal threaded portion 14 is adapted for connection to the conduit 26 from the electric circuit. An externally threaded plug 28 is shown as making connection upon the threads 18 on the branch opening 16.

In Figure 2, metal piping 10 is shown as being externally threaded at both ends as indicated by the reference numeral 12. A branch opening 16 is shown with internal threads 18 with an accommodating plug 28 therefor. Over the threads 12, union nuts 20 are fitted. The union nuts are also internally threaded for connections to the conduit elements 22 and 26 respectively.

From a commercial viewpoint, this one-piece form of condulet of the invention is less costly and saves space and work in industrial wiring. Thus the sealing union condulet of this invention presents advantages over prior art equipment in the number of fittings required, the shorter time of making a gas-tight connection and the saving of space in the wiring layout.

What is claimed is:

In a conduit system for elements of an electrical circuit, a means for making a separable, gas-tight connection between units of said conduit system, comprising a body member, engageable between adjacent ends of two units of said system by means of an annular outwardly flanged coupling on at least one of said unit ends, and an inwardly flanged union nut threaded on said body member to engage said coupling in fluid-tight relation with said body member, an enlarged passageway laterally through one wall of said body member, a fluid-tight removable cover plate for said passageway, and port means in said plate, including a removable closure therefor, for introducing a solidifiable fluid material through said plate into the body member to seal the space therein, around the elements of an electrical circuit carried in said system.

CLARENCE DILTS VAN FLEET.

REFERENCES CITED

The following references are of record in the file of this patent:

UNITED STATES PATENTS

| Number | Name | Date |
|---|---|---|
| 607,983 | Cooper | July 26, 1898 |
| 930,060 | Eynon | Aug. 3, 1909 |
| 960,744 | Vogel | June 7, 1910 |
| 1,681,097 | Church | Aug. 14, 1928 |
| 1,717,640 | Weisgerber | June 18, 1929 |